Patented Aug. 22, 1944

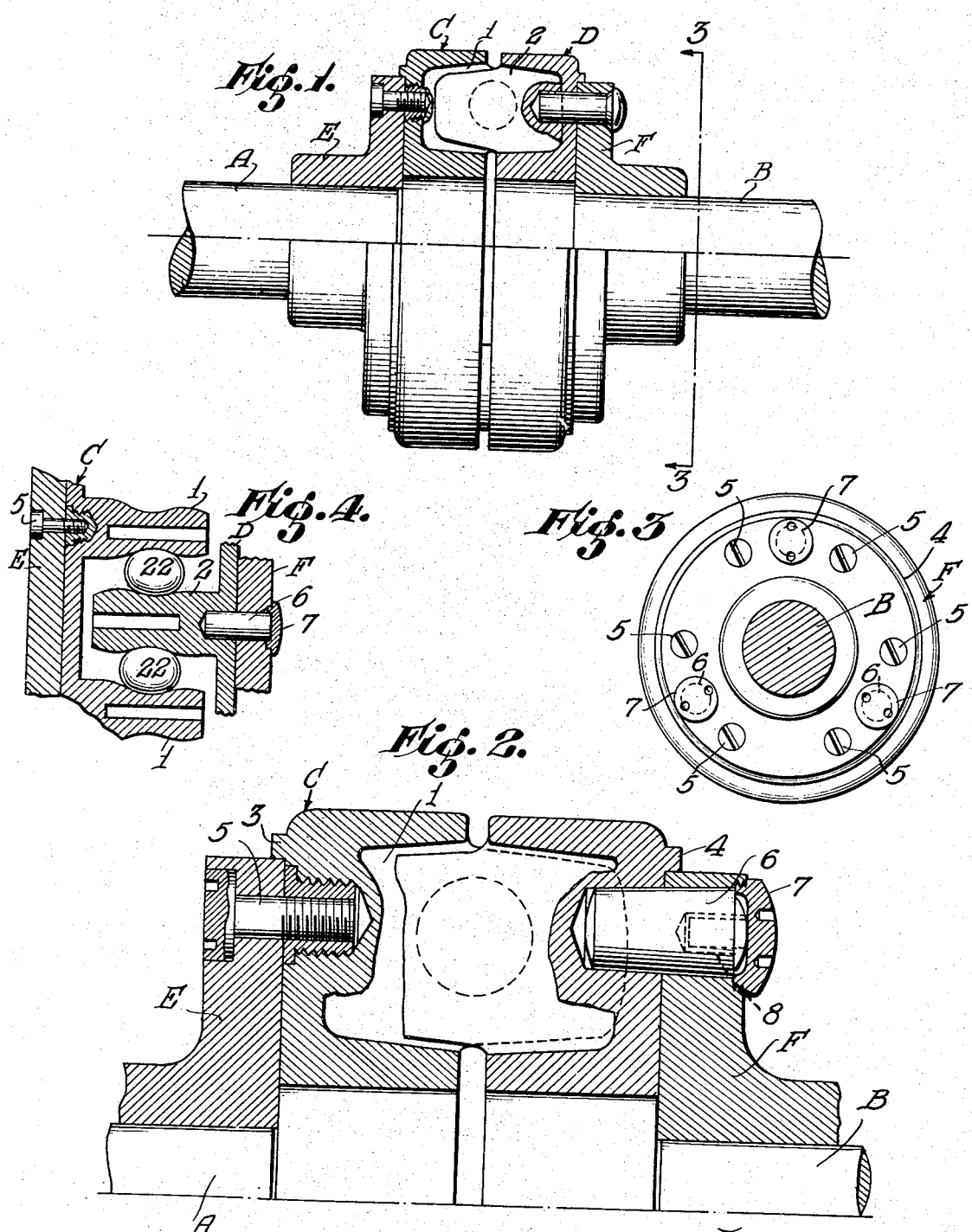

2,356,572

UNITED STATES PATENT OFFICE 2,356,572

ELASTIC COUPLING DEVICE WITH RUBBER BALLS

Mario Dornig, Milan, Italy; vested in the Alien Property Custodian

Application November 5, 1940, Serial No. 364,466
In Italy November 6, 1939

1 Claim. (Cl. 64—14)

The present invention relates to an elastic coupling device for alined shafts, of the type employing rubber balls.

The cushioned coupling device according to the invention, for mechanically transmitting power from a driving to a driven shaft, comprises rotary driving and driven members in fixed coaxial alinement, the driving and driven members having complementary series of axially extending lugs, with facing complementary concave engaging portions, and a series of transmitting spheroidal bodies of elastically compressible material such as rubber, each body being interposed and confined between a pair of such concave driving and driven lug portions. The lug portions and the interposed elastic body are so relatively arranged that the transmitting stresses operate to compress on the body substantially at right angles to a plane extended through the rotation axis and the center portion of the body. Said members and bodies are adapted to be assembled by axial approaching movement, the lugs of said complementary series having for this purpose a relatively flared configuration so as first to roll and progressively compress the bodies in the act of assembling the device, followed by the said concave lug portions wherein the bodies are then relaxed and allowed to expand as they come into operating position.

According to the present invention, the coupling is designed so as to be fitted-on and demounted from said shafts, without any displacement of the latter additionally, the invention solves the problem of avoiding fitting in the rubber spheres during the assembly, this operation being performed separately, the assembled device being mounted in operative position afterward.

One of the characteristic features of the invention consists in providing two half-couplings wherein the rubber balls can be fitted separately, the two coupling-halves being then fitted on the shafts-ends placed at a proper distance, means being provided for fixing the two half-couplings together and on the ends of the shafts.

In the illustrative embodiment of the invention, the means for connecting the half-couplings to each other and on the shafts comprise flanges keyed to said shafts and connected by proper means to the half-couplings.

The invention will now be disclosed with reference to the annexed drawing which shows a simple embodiment as illustrative of the invention but without limiting the scope of the appended claim.

Fig. 1 is a side view of the coupling, half of which is in section; and

Fig. 2 is a partial section in larger scale.

Fig. 3 is a sectional view taken on the line 3—3 of Fig. 1.

Fig. 4 is a development of the coupling shown in section and with parts broken away.

In the drawing, A and B are the two shafts; C and D the two half-couplings; E and F the flanges for fixing the above to the shafts.

As shown, the ends of the shafts A and B are spaced apart by a certain amount so as to allow the members C and D, mounted separately, to be inserted between said ends.

The two half-couplings C, D have projections 1 and 2 respectively, which extend longitudinally and which have engaging cup-shaped members, complementary to each other, wherein are inserted the rubber balls 22, each ball being limited within a pair of said cup-shaped parts, so that the transmission stresses act upon the balls substantially in a direction at right angles to a plane passing through the axis of rotation and the central part of the ball.

The balls 22 are fitted-in by a longitudinal shift, approaching parts C and B, in which shift, due to the particular shape of the facing cups, first a rolling of the balls, then their progressive compression is obtained, until the balls enter the cup-shaped recesses formed in projections, expanding, preferably, just slightly, so that they remain partially compressed.

For mounting the two half-couplings, C and D, together a lathe can be used, fixing one of the half-joints to the head and the other to the tail-stock.

The group of the two half-couplings connected together with the balls is then slipped-in between the two flanges E and F, previously fixed on the two shafts A and B.

During this operation, the two half-couplings can be compressed against each other, so as to enable their being slipped into position, a relatively slight pressure being sufficient, due to the rolling of the balls 22, to decrease the total width of group C—D enough to allow the rims 3 and 4 to pass between the flanges E and F. The subsequent expansion of parts C—D will center them in position on the respective flanges. The rigid connection between the flanges and each half-coupling is secured by screws 5 (six of which are provided in the example): these being, at first, screwed on loosely. The conical pins 6 (three per each semi-coupling in the example shown) transmit the torque. These pins are fixed, blocked and secured by covers 7. Once the pins are fitted, the above screws 5 are tightened and the coupling is applied securely.

For disassembling the coupling proceed in the reverse manner, taking care that after having removed caps 7, the conical pins are taken out by screwing, in the threaded holes 8, an extractor which would be provided with the coupling.

Though a complete embodiment has been declared here, it should be understood that, in practice, alterations to it may be made without thereby exceeding the limits of the invention.

What I claim is:

In an elastic device for connecting a driving member and a driven member which are secured on substantially aligned spaced apart shafts and which employ elastic ball means in effecting the coupling of said shafts, the combination comprising a radially extending flange member secured on each shaft to rotate therewith adjacent said spaced apart end, a pair of coupling plates, each plate mounted on a separate shaft near the spaced apart end thereof and adapted to be secured to the flange member on such shaft to face the plate on the other shaft, said plates having spaced intermeshing projections on their adjacent faces which extend in directions parallel to the longitudinal axes of said shafts, each of said projections provided with depressions complementary to each other, elastic ball means engaged between each pair of adjacent projections and within said complementary depressions in said projections when said plates are coupled, screw threaded means extending through each flange member and engaged with the coupling plate adjacent thereto for initially securing such plate to its respective flange and preventing displacement thereof axially of said shafts, torque transmitting means between said plates comprising a plurality of conical pins, each of said flanges provided with a plurality of conical openings therethrough and each coupling plate provided with a plurality of conical shaped openings therein, each of said pins tightly engaged within a separate pair of said openings, and separate threaded means for retaining each pin in its respective opening.

MARIO DORNIG.